E. D. PUTT.
GAUGE FOR CALENDERED RUBBER STOCK.
APPLICATION FILED DEC. 13, 1919.

1,437,117.

Patented Nov. 28, 1922.

Witness:
Fred C. Harrison

Inventor:
Edward D. Putt,
By G. L. Ely, Atty.

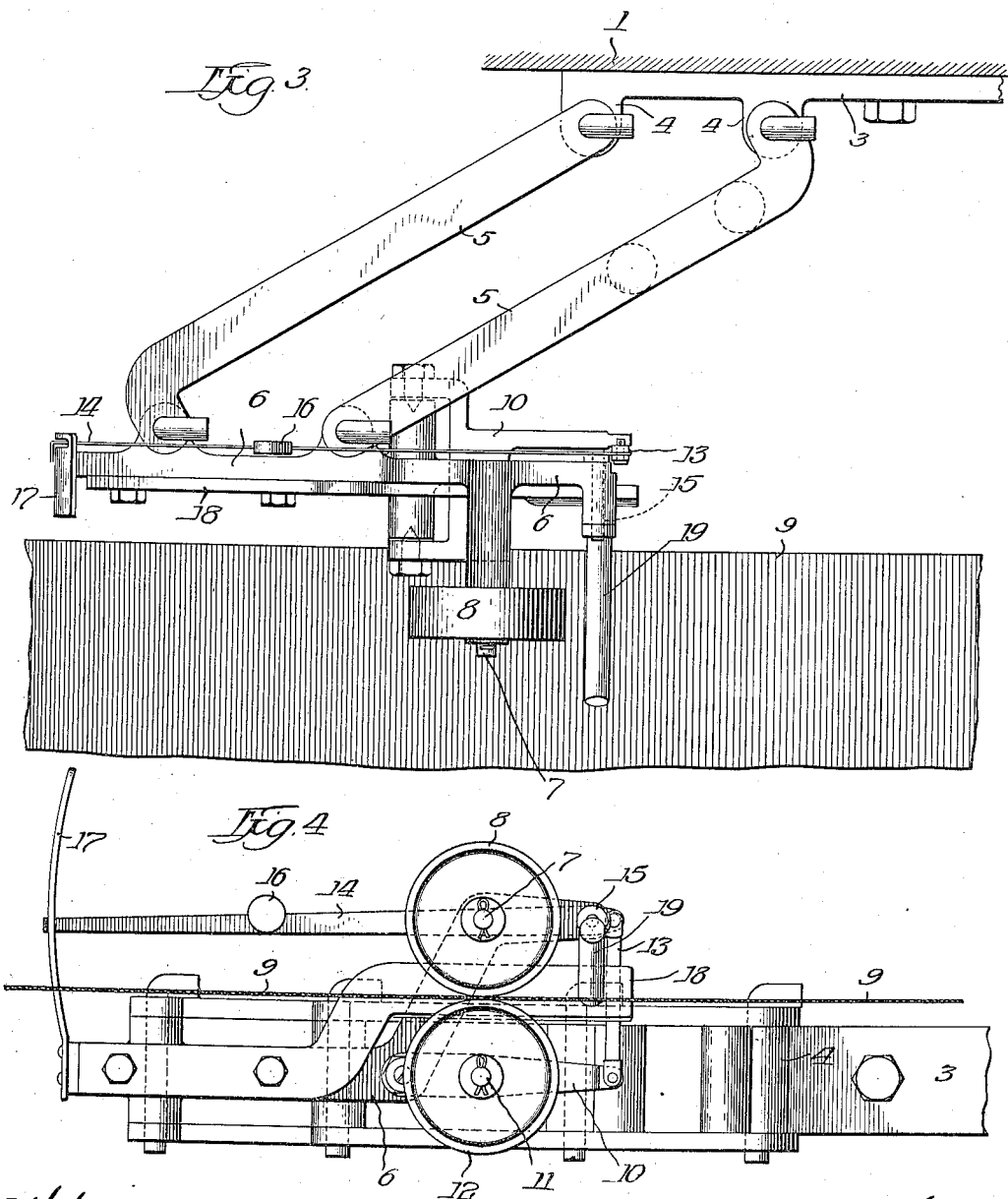

Patented Nov. 28, 1922.

1,437,117

UNITED STATES PATENT OFFICE.

EDWARD D. PUTT, OF AKRON, OHIO, ASSIGNOR TO THE FIRESTONE TIRE AND RUBBER COMPANY, OF AKRON, OHIO, A CORPORATION OF OHIO.

GAUGE FOR CALENDERED RUBBER STOCK.

Application filed December 13, 1919. Serial No. 344,508.

*To all whom it may concern:*

Be it known that I, EDWARD D. PUTT, a citizen of the United States, residing at Akron, in the county of Summit, State of Ohio, have invented certain new and useful Improvements in Gauges for Calendered Rubber Stock, of which the following is a specification.

This invention relates to an apparatus for use particularly in rubber factories, and is designed for attachment to and combination with calenders for sheeting rubber stock or for impregnating and coating fabric.

In the manufacture of articles of rubber or fabric and rubber, it is essential that the thickness or gauge of the stock be maintained accurately, being measured with thousandths of an inch, and it is essential that operators of the calenders be informed accurately and quickly of any variations occurring in the thickness of the stock. It was formerly the practice to cut out pieces from the edges of the stock and convey them to the micrometer gauge to verify or arrive at the proper thickness, so that the rolls may be set accordingly. This operation is extremely wasteful, not only of the material that is cut out but the portions of the stock adjacent the cut may be rendered unfit for use. A further objection to the present mode of gauging calendered stock is that the measurements are delayed so long as to be inaccurate. In the time during which the cut-out piece is removed and placed on the micrometer, the portion of the stock for which the measurement is taken has past the calender rolls.

In place of the unsatisfactory and wasteful method in use at the present time, it is proposed to combine with a calender a gauge mounted thereon which is designed to measure the thickness of the stock as it passes through the machine. This will eliminate the necessity of cutting pieces from the fabric and will give an accurate reading at all times.

These and other objects will become apparent as the description proceeds, it being understood that changes and modifications may be made within the scope of the invention. It will be understood that the use of the device is not limited to rubber factories, but may be extended as found practicable.

In the drawings accompanying this application is shown one form of the invention, in which—

Fig. 3 is an enlarged plan view, and

Fig. 4 is a side elevation.

Figure 1:
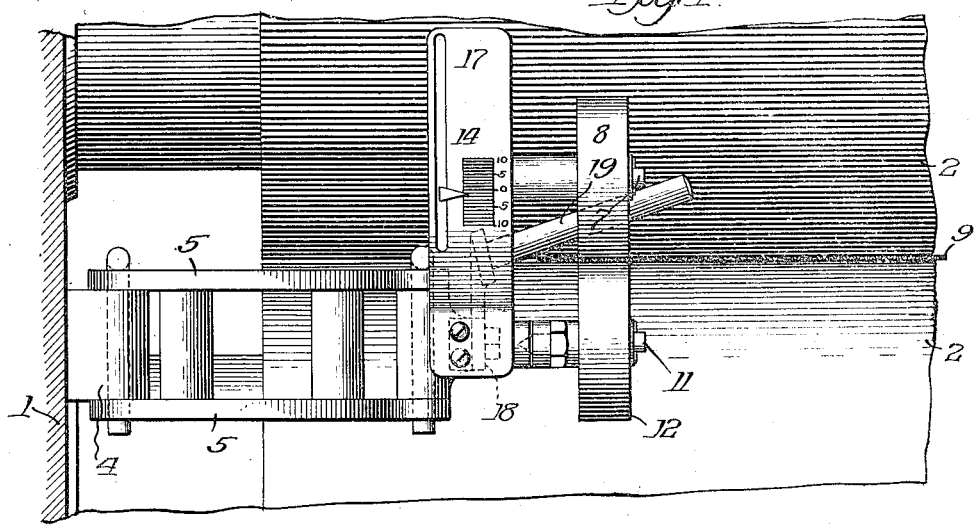
Fig. 1 is a front elevation of a pair of calender rolls showing my improved attachment mounted on the frame of the calender.
Figure 2:
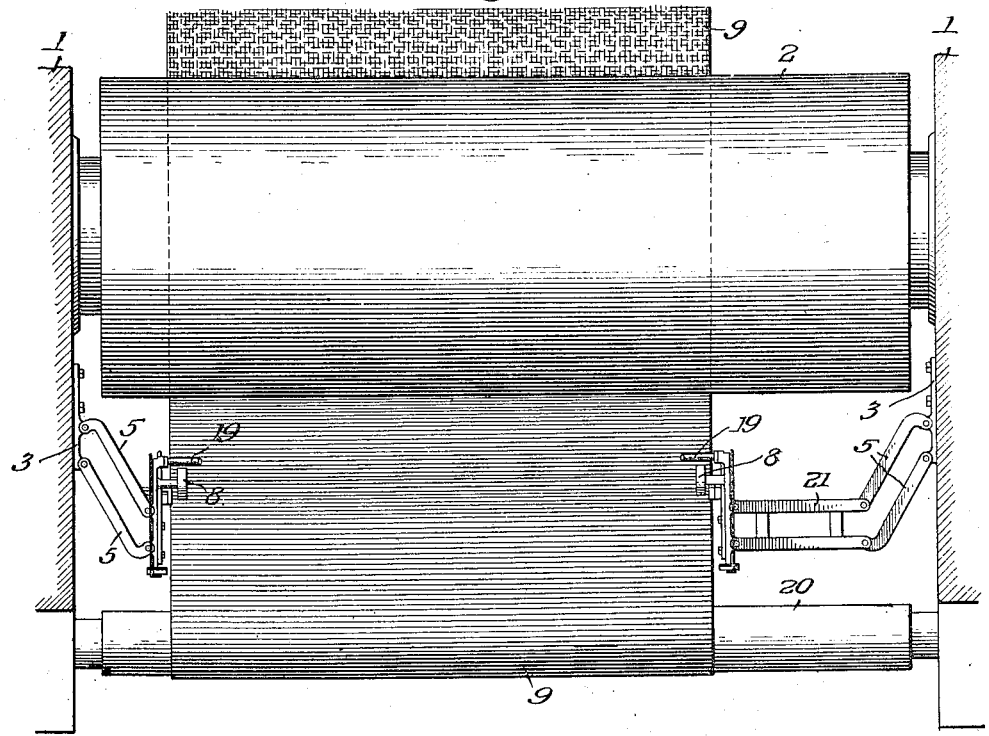
Fig. 2 is a plan view showing methods of mounting the gauge for wide or narrow stock.

In the drawings 1 represents the structure to which the instrument is attached, in this case being the frame of a calender for sheeting out rubber or coating fabric with rubber, the calender rolls being indicated by the numeral 2. To the machine structure, preferably on both sides, are secured brackets or plates 3, which may be formed with two hinge lugs 4. To the lugs are pivotally connected parallel links 5, hingedly connected to a plate or arm 6. This arm may be bent upwardly, as shown in Fig. 4 and then forwardly. At the upper bend in the arm is secured a pin 7 on the end of which is rotatably mounted a roll 8 which is designed to run over the upper surface of the fabric or other stock 9, to be gauged.

Pivotally mounted on the arm 6 is a lever 10 carrying a pin 11 on which is rotatably mounted a roll 12 located directly under the roll 8, the stock passing between the rolls. To the outer end of the lever 10 is secured a link 13, extended upwardly and connected to a lever 14, pivotally mounted on the end of the arm 6 as at 15. The lever 14 carries a weight 16 which serves to keep the roll 12 in light yielding contact with the underside of the stock.

The end of the arm 14 is extended through an arcuate scaled plate 17, which is calibrated to the desired measurement. It will be seen that by the compound leverage variation of even a thousandth part of an inch will be easily readable upon the scale.

To the arm 6 is attached a curved bracket 18 which extends to a point in front of the rolls 8 and 12 and carries a pin 19 which projects over the fabric, being designed to fend from the rolls particles of rubber or wrinkles of fabric, which sometimes occur in the calendering. In the calendering of fabric as heretofore practiced, the fabric passes directly over the lower roll, but in attaching this device an additional roll 20 is mounted in the calender frame, the fabric after leaving the calender rolls, passing over this roll. Various widths of fabric may be run through the calender and for this reason a frame extension 21 may be added to the parallel links 5.

In the operation of the device, the gauges are duplicated for both sides of the machine and the rolls are placed with the fabric between them, the links 5 or 5 and 21, assuring parallel movement of the arms so that the rollers 8 and 12 will run true to the fabric. Any variation in thickness is immediately shown on the scale. If a piece of rubber falls on the fabric or a bad wrinkle forms in the calendering, the obstruction will strike the pins 19 and either be removed from the fabric or the swinging frame will be swung away from the fabric.

The device described is a distinct advance over present methods of gauging, saves the waste heretofore indulged in and gives more accurate and reliable measurements than possible with other arrangements.

Although the description is quite detailed, it will be understood that modifications are possible without changing the invention or sacrificing any of its benefits. Such different forms as are comprehended within the scope of the invention are intended to be covered by the appended claims.

I claim:

1. In an apparatus of the character described, a calender framework, a movable plate supported on the framework, a pair of separable rolls carried by the plate, said rolls being arranged to be located on the upper and lower sides of the stock and separable by the thickness of the stock, a scale carried on said plate and means whereby the relative movement of the rolls is registered on the scale.

2. In an apparatus of the character described, a calender framework, a freely movable plate, parallel links connecting the plate with the framework, a pair of separable rolls on said plate, designed to be received above and below the stock, multiplying leverage connected to said rolls and an indicating device associated with said leverage whereby variations in the gauge of the stock are registered.

3. In an apparatus of the character described, a calender framework, a freely swinging plate supported on the framework, a pair of separable rolls on said plate, a scale, and means whereby the separation of the rolls is registered on the scale.

4. In an apparatus of the character described, a plate, means for supporting said plate, said means permitting free lateral movement of the plate, a pair of members for contacting the surface of the stock, means for supporting said members on said plate so that they are separable under the influence of the stock, a registering device and a multiplying lever system connecting the separable rolls and the registering device.

5. In an apparatus of the character described, a plate, a pair of parallel swinging links supporting said plate, a pair of members for contacting the surfaces of the stock, means for supporting said members on said plate so that they are separable under the influence of the stock, a registering device, and a multiplying lever system connecting the separable rolls and the registering device.

6. In an apparatus of the character described, a plate, a pair of swinging parallel links supporting said plate, a surface contacting member on said plate, a lever pivoted to said plate, a second surface contacting member on said lever, a multiplying lever system connected to said lever, and a registering device actuated by said levers.

7. In an apparatus of the character described, a plate, means to support said plate for free swinging movement, measuring devices on said plate, and a fender carried on said plate in front of said measuring device.

8. In an apparatus of the character described, a plate, a pair of swinging links supporting said plate so that it is capable of lateral movement, measuring devices on said plate and a fender carried on said plate and projecting in front of said measuring devices.

9. In an apparatus of the character described, a plate, means to support said plate for free lateral movement relative to the stock, a stock thickness measuring device on said plate and a fender projecting in front of said measuring device and adapted to move same under obstruction.

10. In an apparatus of the character described, a plate, means to support said plate for free lateral movement relative to stock, a stock thickness measuring device on said plate, and a pin carried by said plate and projecting in front of said measuring device and adapted to move the plate laterally under obstruction on said stock.

11. In an apparatus of the character described, a plate, a pair of parallel swinging links to support said plate for lateral movement relative to the stock, a roller stationarily mounted on said plate, a second roller movably mounted on said plate, the rollers being adapted to contact the two surfaces of stock to be gauged, a series of multiplying levers supporting and actuated by the second roller and a registering device in conjunction with said lever system.

12. In combination with a calender unit for rubber stock, a thickness gauge mounted on said calender for free lateral movement relative to the stock, means for conducting the stock from the unit to the gauge, and a fender connected to and in front of said gauge whereby the gauge may be moved laterally upon the approach of an obstruction on the stock.

EDWARD D. PUTT.